United States Patent [19]
Soprano et al.

[11] Patent Number: 5,297,136
[45] Date of Patent: Mar. 22, 1994

[54] MULTICARRIER DEMODULATOR

[75] Inventors: Claudio Soprano, La Haye; Luigi Bella, Noordwijk-aan-zee, both of Netherlands

[73] Assignee: Agence Spatiale Europeenne, Paris Cedex, France

[21] Appl. No.: 859,314

[22] PCT Filed: Sep. 25, 1991

[86] PCT No.: PCT/EP91/01847

§ 371 Date: May 27, 1992

§ 102(e) Date: May 27, 1992

[87] PCT Pub. No.: WO92/06545

PCT Pub. Date: Apr. 16, 1992

[30] Foreign Application Priority Data

Oct. 2, 1990 [FR] France ................ 90 12109

[51] Int. Cl.$^5$ .................................... H04J 4/00
[52] U.S. Cl. ......................... 370/50; 370/70; 370/84; 329/327
[58] Field of Search ............. 370/49.5, 50, 69.1, 370/70, 84; 329/327

[56] References Cited

U.S. PATENT DOCUMENTS

| | | | |
|---|---|---|---|
| 4,754,449 | 6/1988 | Crookshanks | 370/70 |
| 4,785,447 | 11/1989 | Ichiyoshi | 370/70 |
| 4,884,265 | 11/1989 | Schroeder et al. | 370/70 |
| 5,038,344 | 8/1991 | Kawamura | 370/50 |

FOREIGN PATENT DOCUMENTS 2043402 10/1980 United Kingdom .......... H04J 4/00

OTHER PUBLICATIONS

IEEE Global Telecommunications Conference, Tokyo, Japan, Nov. 15–18, 1987, vol. 1, pp. 8.4.1–8.4.6.
IEEE, New York, U.S., Kohri et al.: "A 400ch SCPC signal demodulator using chirp transform and correlation detection scheme" voir abrégé; figure 1,2.
"Onboard Multicarrier Demodulation for Nontransparent Satellite Repeaters", Electrical Communication, vol. 62, No. 3/4, 1988.

*Primary Examiner*—Douglas W. Olms
*Assistant Examiner*—Hassan Kizou
*Attorney, Agent, or Firm*—Ladas & Parry

[57] ABSTRACT

A device in which the frequency band (W) of a multiple carrier signal (MCS) is divided into a number K of sub-bands. The data contained in each sub-band are sampled at a predetermined rate (Sr) to generate a spaced sequence of samples. The data samples from all the sub-bands are time multiplexed to produce a composite signal comprising the K successive spaced sequences of samples. In this way, the composite signal transmits the data at a high apparent rate suitable for demodulation by a conventional multiple carrier demodulator designed for this high data transfer rate. This device is used in satellite communication systems.

15 Claims, 2 Drawing Sheets

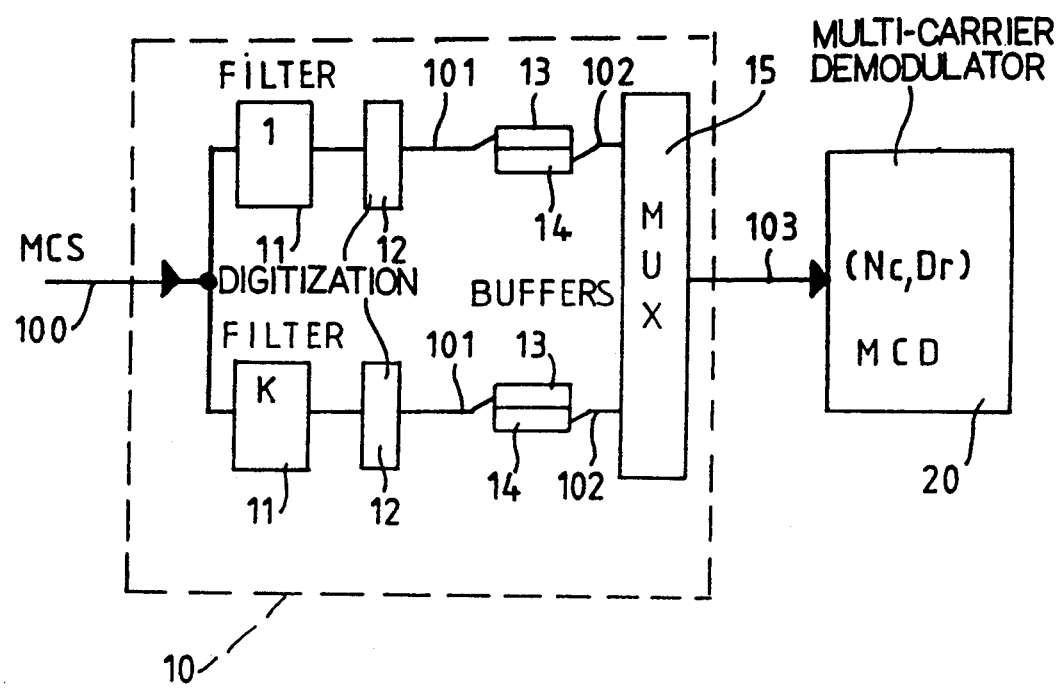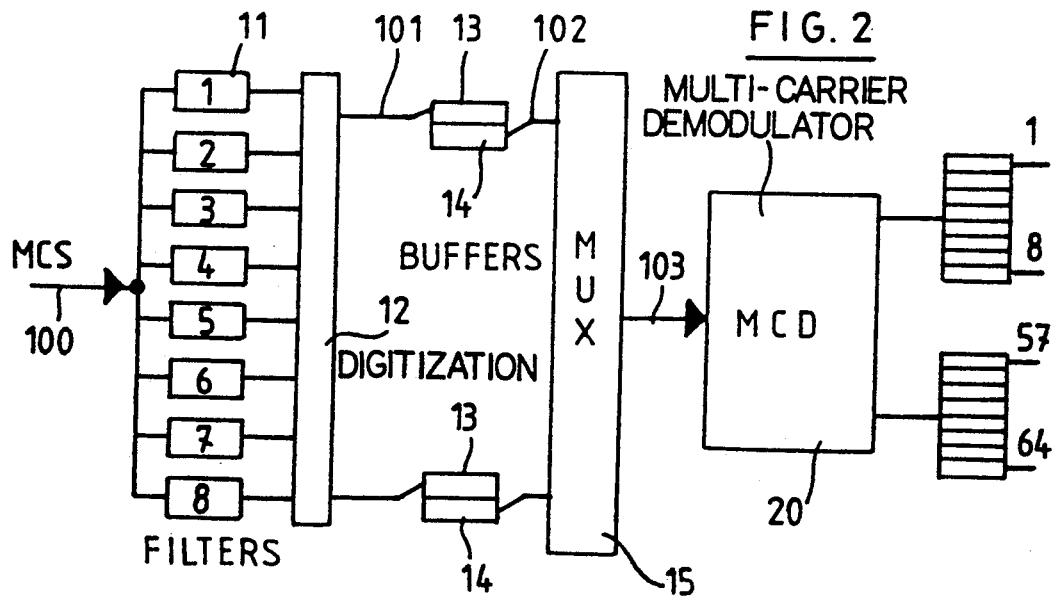

MULTICARRIER DEMODULATOR

The present invention relates to satellite data communication systems and it is in particular concerned with an apparatus to demodulate simultaneously a great number of data channels having low and medium data rates, that is data rates lower than 4 Mbit/s.

Nowadays the satellite communication networks are experiencing an evolution from the original trunk oriented network configuration in which the data are transmitted at a high data rate (typically 4 Mbit/s) towards user oriented network configurations including small stationnary and mobile earth stations operating at relatively low data rates down to e.g. 64 kbit/s. In such networks, either private or public, the earth stations have different needs in communication capabilities in accordance with the number of users which are to be served. The problem then is to optimize the apportionment of the available communication capability between the different operating systems. Heretofore, sharing the overall communication capacity was made by defining a range of data rates for each system. To cite two examples, the INTELSAT IBS communication system operates at data rates from 64 kbit/s to 4 Mbit/s, while the EUTELSAT SMS communication system operates at data rates from 64 kbit/s to 2 Mbit/s.

In order to process a great number of data channels it is known to use an apparatus called multicarrier demodulator (MCD) that is capable to simultaneously process a great number of carriers modulated each by one data channel. An apparatus of this type is disclosed for instance in U.S. Pat. No. 4,754,449. However, such a known apparatus is designed to process only data channels having a fixed data rate. Now in those new business applications which are anticipated for satellite communication systems an earnest need has arisen for apparatus capable of simultaneously handling data channels having different data rates and more particularly apparatus capable of simultaneously processing various combinations of data channels having various data rates without loss in bandwidth, for instance an apparatus which is capable of demodulating 16 channels transmitting data at a rate of 2 Mbit/s as well as any operating combination up to 512 channels transmitting data at a rate of 64 kbit/s still in the same frequency bandwidth.

A multicarrier demodulator capable of processing data having different data rates is disclosed in the publication Electrical Communication Vol. 62, No. 3/4, 1988. This demodulator implements a signal processing method and comprises for each channel complex filters for translating the channel frequency band to the baseband, a synchronizer and a shaping filter. The method which is carried out in this known demodulator results in an architecture that has the drawback of being complex and bulky, which makes it improper for being used on board a satellite.

The object of this invention is to remedy the above drawback by providing a demodulator apparatus capable of processing data channels having variable data rates, which is simple to construct and less bulky and which can thus be used either on board a satellite or in an earth station.

In accordance with an aspect of the invention there is provided an apparatus for demodulating a multicarrier signal, comprising an input circuit as defined in the claims, by virtue of which a known multicarrier demodulator is made capable of processing data channels having different data rates.

The input circuit according to this invention is based on the implementation of a method of processing a multicarrier signal occupying a predetermined frequency bandwidth, in which, in accordance with a further aspect of the invention, the frequency band of the multicarrier signal to be processed is divided into a predetermined number K of sub-bands in each of which the number of modulated carriers is related to the data rate adopted for the respective sub-band. Then the data contained in each sub-band or group of subbands are sampled at a predetermined rate to generate a plurality of expanded sample sequences. Said expanded sample sequences thus generated are thereafter time multiplexed after one another thereby to produce a composite sequence in which the data have an apparent rate higher than the data rate in said multicarrier signal, the composite sequence being intended to be demodulated in a conventional multicarrier demodulator.

The invention has the advantage of making it possible to use simple and less bulky demodulation circuitry, e.g. a conventional fixed parameter demodulator intended to accept data having a high data rate in order to demodulate and reconstruct data having different lower data rates. The invention also makes it possible to reconfigure the general circuit arrangement of the demodulation circuitry in a simple and fast way so that it is capable of processing data having different combinations of data rates without waste of frequency bandwidth. In short, the invention affords a great flexibility of operation and lends itself to a wide range of interesting applications.

The features and advantages of the invention will be more readily apparent from the following disclosure when read in conjunction with the accompanying drawings, in which:

FIG. 1 is a simplified schematic diagram illustrating the basic configuration of the arrangement according to the invention.

FIG. 2 illustrates an exemplary embodiment of the arrangement of FIG. 1.

Figure 3:
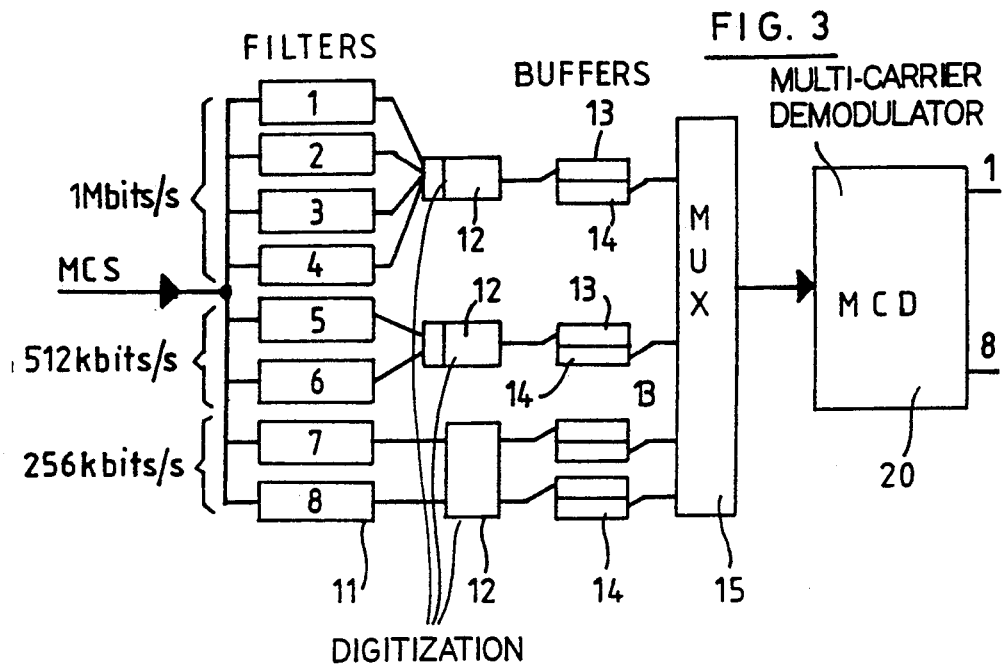
FIGS. 3 and 4 show two examples of variations of the embodiment of FIG. 2, especially adapted for two exemplary applications.

Referring to FIG. 1 which illustrates the basic configuration of the arrangement according to the invention, the reference numeral 20 designates a multicarrier demodulator circuit, known per se, with the following operation parameters: a number Nc of carriers and a nominal data rate Dr. It is known that such a demodulator circuit is used to simultaneously demodulate Nc carriers modulated by digital data delivered at a data rate Dr. In accordance with this invention there is provided an input circuit designated as a whole by reference numeral 10. This circuit, that shown connected between an input transmission line 100 and the input of the demodulator circuit 20, has the purpose of permitting the demodulator circuit 20 to accept from the input transmission line 100 a multicarrier signal MCS containing several carriers modulated each by one digital data channel at a data rate lower than the nominal data rate Dr of the demodulator circuit 20.

Referring in particular to the circuit arrangement in block 10 in FIG. 1, a set of K bandpass filters 11 are connected in parallel to receive the multicarrier signal MCS occupying a frequency spectrum having a bandwidth W. Each filter has a distinct pass bandwidth equal to W/K Hertz such that the set of filters 11 is effective to divide the frequency bandwidth W into a number of sub-bands, each of said sub-bands being capable of transmitting Nc/K modulated carriers. At the output of each filter 11 there is connected a digitization circuit 12 that operates to sample the filtered signal at a predetermined rate and translates the signal back to the baseband thereby to produce a sample sequence on lines 101. The samples on each line 101 are received in a storage means 13 provided for buffering the samples. In the exemplary embodiment illustrated, two buffers 13 and 14 are provided for alternately storing the sample sequences. While one of the buffers in each pair of buffers is being loaded with a sample sequence, e.g. buffer 13, the contents of the other buffer is read out by a time multiplexer 15. The latter cyclically scans the outputs of all the buffers that are not being loaded at this time, e.g. the buffers 14 in the operation state as shown in FIG. 1.

With Sr designating the sampling rate, the time cycle of the time multiplexer 15 is such that the contents of each storage means is presented at one input 102 of the multiplexer at a rate equal to Sr*K whereby the frequency spectrum on line 102 is expanded to the bandwidth W of the input multicarrier signal MCS. The output of multiplexer 15 produces a composite signal containing, after one another, the K expanded sample sequences that are sequentially read out of the storage means. It is to be noted that each sample is representing a time signal which contains the carriers applied at the input of a bandpass filter 11 the frequency spectrum of which has been expanded to the bandwith W of the input multicarrier signal MCS and the data rate of which has been expanded to the nominal rate Dr.

FIG. 2 schematically represents an exemplary embodiment of the input circuit according to the invention arranged to feed a multicarrier demodulator circuit 20, known per se, which is designed for eight carriers (Nc=8) modulated by digital data having a data rate of 2 Mbit/s (Dr=2 Mbit/s). The input circuit 10 includes eight bandpass filters 11 (K=8) operating to divide the frequency bandwidth W of the incoming signal MCS in eight sub-bands. Each sub-band may contain eight modulated carriers whereby the incoming signal MCS in the same frequency bandwidth W, may contain 64 carriers that are modulated by digital data at a rate of 256 kbit/s, with the carriers having a frequency spacing equal to one eighth of the nominal frequency spacing of the carriers when same are modulated by digital data at a rate of 2 Mbit/s.

Each buffer 13 or 14 thus stores a sequence of data samples at 256 kbit/s and the time cycle of the time multiplexer 15 has a duration equal to eight times the read time at the output of a buffer 14 or 13. At output 103 of the time multiplexer 15 there is thus produced a composite sample sequence which comprises the eight expanded sequences of samples successively read out of the eight buffers 14 or 13. The composite sequence occupies a frequency spectrum having the bandwidth W that can be accepted by the demodulator circuit 20. The apparent rate of the digital data delivered by the time multiplexer 15 is then 2 Mbit/s, that is the data rate for which the demodulator circuit 20 was designed in the example described herein. It is therefore possible to use a conventional demodulator circuit in order to reconstruct the 8×8 sequences of data at 256 kbit/s.

It is worthy of note that an existing multicarrier demodulator designed for a predetermined data rate may be quite easily used, without any modification of its design, for processing data channels having a lower data rate, subject to merely adding an input circuit in accordance with the invention. Said circuit thereby makes it possible to broaden the feasibility of using a multicarrier demodulator in satellite communication systems.

Basically, a circuit according to the invention achieves the result sought for in terms of data rate of the digital data channels by carrying out a method in which the frequency bandwidth of the multicarrier signal to be processed is divided into a predetermined number of sub-bands containing each a number of modulated carriers that is chosen having regard to the data rate adopted for the respective sub-band. The data contained in each sub-band or group of sub-bands are sampled at a predetermined rate thereby to generate a number of sample sequences the frequency spectrum of which is expanded to the full bandwidth of the multicarrier signal. After buffering, the expanded sample sequences are multiplexed in the time domain after one another thereby to produce a composite sequence in which the data have an apparent data rate that is higher than the data rate in the incoming multicarrier signal.

One noteworthy advantage of the invention resides in that it affords a great flexibility of implementation by making it possible to process simultaneously data channels which transmit digital data at different data rates provided that a proper bandpass filter configuration is used. As a matter of fact, the frequency subband transmitted by each filter 11 may contain any number of carriers and convey a variable number of data channels depending on the data rate adopted and the data in each sub-band may be processed independently of the data contained in the other sub-bands. The data rate in each frequency sub-band may be chosen freely between Dr and Dr/Nc, and the number of carriers transmitted by each one of the bandpass filters 11 is equal to the ratio between the nominal data rate Dr and the real rate of the data modulating the carriers.

Thus, a circuit according to the invention makes it feasible to transmit in one sub-band, for instance 2 carriers at a rate of 1 Mbit/s or
8 carriers at a rate of 256 kbit/s or
16 carriers at a rate of 128 kbit/s or
32 carriers at a rate of 64 kbit/s.

FIG. 3 illustrates an example of configuration arranged to handle data delivered at three different rates: data at 1 Mbit/s in channels 1 to 4; data at 512 kbit/s in channels 5 and 6; and data at 256 kbit/s in channels 7 and 8. In this exemplary embodiment the outputs from the bandpass filters 11 for channels 1 to 4 are added and the combined group of the signals in these four channels is then sampled as a whole in a common sampler 12 at a predetermined rate thereby to expand the sample sequence as generated to the bandwidth W of the multicarrier signal. Likewise, the outputs from the bandpass filters for channels 5 and 6 are combined before sampling. As to the outputs from the filters for channels 7 and 8, they are sampled separately as they are in the arrangement shown in FIG. 2. The expanded sample sequences, as buffered in the storage means 13/14, are thereafter multiplexed as outlined in the foregoing.

Considering generally an even number X of bandpass filters 11 among the K filters provided in the scheme, it is possible to sum the output signals from these X filters, to sample the resulting signal at a sampling rate equal to Sr*X, and to couple these samples to a pair of buffers 13, 14 having a storage capacity equal to L*X. These two buffers serve the purpose of the X pairs of buffers 13 and 14 which would have been used in the basic configuration of FIG. 1.

The multiplexer 15 scans alternately the outputs of the storage means and the time cycle of the multiplexer has then a duration equal to the read time at the output of one storage means multiplied by X. If Nc denotes the number of carriers passing through the set of X filters and if the common data rate is (Dr/Nc)*X, then the resulting spectrum has such a bandwidth that the signal which is coupled to the input of the multicarrier demodulator conforms to the parameters Nc and Dr, and as a consequence the signal is suited for being demodulated by a multicarrier demodulator designed for parameters Nc and Dr. From the foregoing it will be apparent that a great flexibility of operation results from using the invention.

Figure 4:
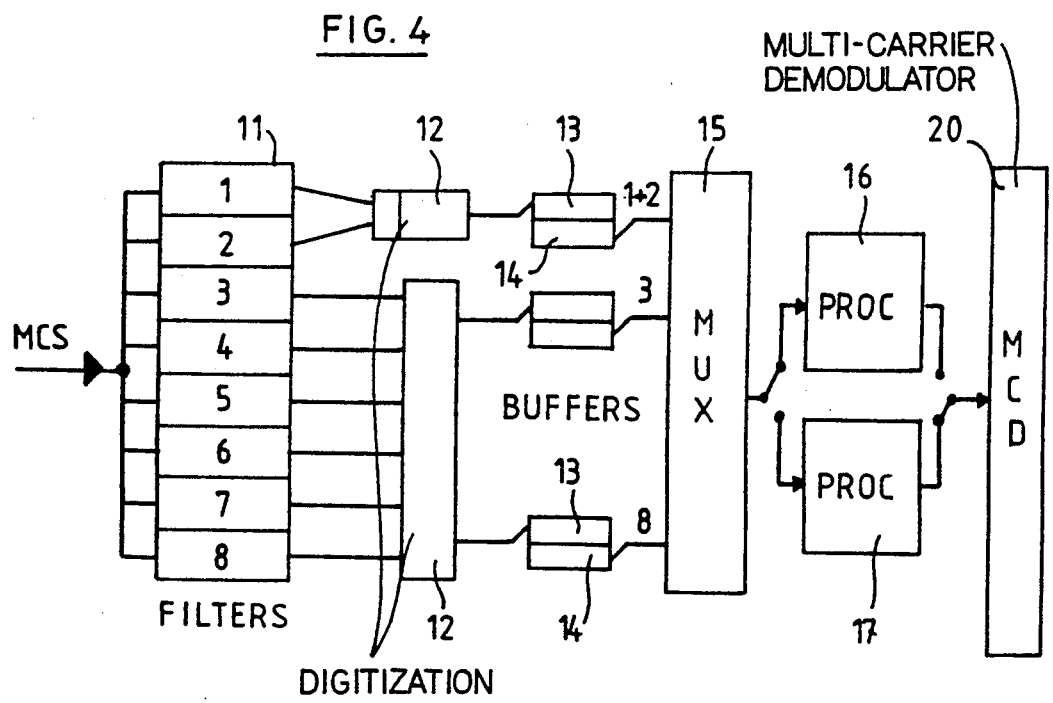

The flexibility may still be extended further if the values of the parameters Nc and Dr are modified to Nc*K and Dr/K during the scanning cycle of the multiplexer. An example of such an application is illustrated in FIG. 4. In this example, two output processors 16, 17 are connected to the output of multiplexer 15, said processors being organized to compute the fast Fourier transforms, one of said processors being operating while the other one gets reprogrammed for processing the data contained in the following frequency sub-band.

The circuitries for performing the various functions carried out in the arrangement according to the invention may obviously be implemented in various embodiments that are within the ordinary skill of one skilled in the art. It is also obvious that the bandpass filters implemented in the arrangement may be realized either in analog or digital form.

We claim:

1. In an apparatus arranged to demodulate a multicarrier signal which occupies a predetermined frequency bandwidth and comprises a plurality (Nc) of carriers, where Nc represents the number of carriers in said plurality, modulated by data transmitted having a first predetermined data rate, an input circuit for enabling a multicarrier demodulator to process a plurality of data channels each having a data rate less than said first data rate, said input circuit comprising:
   first means (11) connected to receive said predetermined frequency bandwidth and divide said frequency bandwidth into a number (K) of distinct frequency sub-bands, where K represents the number of sub-bands each frequency sub-band being occupied by Nc/K carriers modulated by a data channel having a data rate different from the first data rate,
   a plurality of sampling means (12) each being connected to the output of at least one band dividing means, each sampling means being arranged to sample the output signal from said band dividing means at a predetermined rate so as to generate a distinct expanded sample sequence, in which a frequency spectrum is expanded to the bandwidth of the input multicarrier signal,
   a plurality of store means (13), each of which being connected to the output of a sampling means so as to buffer the expanded sample sequence as generated,
   multiplexer means (15) arranged to periodically scan each of said store means at a predetermined rate so as to read out successively each stored sample sequence and to produce a composite sequence containing the plurality of successive expanded sample sequences, said composite sequence being applied to the input of said multiplexer demodulator (20).

2. An input circuit according to claim 1, wherein each sampling means (12) is associated with a pair of store means (13, 14) arranged such that the inputs thereof are connected alternately to the output of said sampling means, the outputs of said pair of store means being connected to be scanned alternately by said multiplexer means (15), the output of one of said pair of store means being provided for being scanned while the input of the other of said pair of store means is connected to the output of the respective sampling means.

3. An input circuit according to claim 1, wherein at least one of said band dividing means (11) accepts a subband occupied by a number of carriers different from the number of carriers in the other sub-bands, the carriers in said sub-band being modulated by data having a rate different from the rate of the data contained in the other sub-bands.

4. An input circuit according to claim 2, wherein at least one of said band dividing means (11) accepts a subband occupied by a number of carriers different from the number of carriers in the other sub-bands, the carriers in said sub-band being modulated by data having a rate different from the rate of the data contained in the other sub-bands.

5. An input circuit according to claim 1, wherein the band dividing means (11) are comprised of analog bandpass filters.

6. An input circuit according to claim 1, wherein the band dividing means (11) are comprised of digital filters.

7. An input circuit according to claim 1, further comprising control means (16, 17) connected to the output of the multiplexer means (15), said control means being arranged so as to reconfigure the output of the input circuit to produce a predetermined data rate or rates.

8. An input circuit according to claim 2, further comprising control means (16, 17) connected to the output of the multiplexer means (15), said control means being arrange so as to reconfigure the output of the input circuit to produce a predetermined data rate or rates.

9. An apparatus for used with a multicarrier demodulator arranged to demodulate a multicarrier signal occupying a predetermined frequency bandwidth and comprising a plurality carriers, where Nc represents the number carriers in said plurality modulated by data transmitted at a first predetermined rate, thereby to enable the demodulator to demodulate a plurality of digital data channels having data rates less than said first data rate, comprising;
   first means (11) connected to receive said predetermined frequency bandwidth and divide said frequency bandwidth into a number (K), where K represents the number of sub-bands, of distinct frequency sub-bands, each frequency sub-band being occupied by Nc/K carriers modulated by a data channel having a data rate different from the first data rate,
   a plurality of sampling means (12) each being connected to the output of at least one band dividing means, each sampling means being arranged to sample the output signal from said band dividing means at a predetermined rate so as to generate a distinct expanded sample sequence.

a plurality of store means (13), each of which being connected to the output of a sampling means so as to buffer the generated expanded sample sequence, multiplexer means (15) arranged to periodically scan each of said store means at a predetermined rate so as to read out successively each stored sample sequence and to produce a composite sequence containing the plurality of successive expanded sample sequences, said composite sequence being intended to be applied to the input of said multicarrier demodulator (20).

10. An input circuit according to claim 9, wherein each sampling means (12) is associated with a pair of store means (13, 14) arranged such that the inputs thereof are connected alternately to the output of said sampling means, the outputs of said pair of store means being connected to be scanned alternately by said multiplexer means (15), the output of one of said pair of store means being provided for being scanned while the input of the other of said pair of store means is connected to the output of the respective sampling means.

11. An input circuit according to claim 9, wherein the band dividing means (11) are comprised of analog bandpass filters.

12. An input circuit according to claim 9, wherein the band dividing means (11) are comprised of digital filters.

13. An input circuit according to claim 10, wherein the band dividing means (11) are comprised of analog bandpass filters.

14. An input circuit according to claim 10, wherein the band dividing means (11) are comprised of digital filters.

15. A method of processing a multicarrier signal occupying a predetermined frequency bandwidth and comprising a plurality of carriers modulated by data having at least one predetermined data rate, comprising the steps of:

(a) dividing the frequency bandwidth of the multicarrier signal to be processed into a predetermined number of subbands in each of which the number of modulated carriers is related to a ratio between a nominal data rate and the real rate of the data modulating the carriers, (b) sampling the data contained in each sub-band or group of sub-bands at a predetermined rate to generate a plurality of expanded sample sequences, (c) time multiplexing the expanded sample sequences as generated after one another thereby to produce a composite sequence in which the data have an apparent data rate greater than the data rate in said multicarrier signal.

* * * * *